(12) United States Patent
Purkayastha et al.

(10) Patent No.: US 10,268,592 B2
(45) Date of Patent: Apr. 23, 2019

(54) SYSTEM, METHOD AND COMPUTER-READABLE MEDIUM FOR DYNAMICALLY MAPPING A NON-VOLATILE MEMORY STORE

(71) Applicant: Avago Technologies International Sales Pte. Limited, Singapore (SG)

(72) Inventors: Saugata Das Purkayastha, Bangalore (IN); Luca Bert, Cumming, GA (US); Philip K. Wong, Austin, TX (US); Anant Baderdinni, Lawrenceville, GA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 625 days.

(21) Appl. No.: 14/192,683

(22) Filed: Feb. 27, 2014

(65) Prior Publication Data

US 2015/0220452 A1 Aug. 6, 2015

Related U.S. Application Data

(60) Provisional application No. 61/934,040, filed on Jan. 31, 2014.

(51) Int. Cl.
*G06F 12/1009* (2016.01)
(52) U.S. Cl.
CPC .............................. *G06F 12/1009* (2013.01)
(58) Field of Classification Search
CPC .. G06F 12/1009; G06F 12/0802; G06F 12/12; G06F 12/121; G06F 12/122; G06F 12/123
See application file for complete search history.

(56) References Cited

U.S. PATENT DOCUMENTS 5,390,315 A * 2/1995 Blandy ................. G06F 3/0601
707/999.202
5,802,341 A * 9/1998 Kline ................. G06F 12/1009
711/209

(Continued)

OTHER PUBLICATIONS

Webopedia, "Cache", Apr. 11, 2001, pp. 1-3; https://web.archive.org/web/20010411033304/http://www.webopedia.com/TERM/c/cache.html.*

(Continued)

*Primary Examiner* — Christopher D Birkhimer
(74) *Attorney, Agent, or Firm* — Sheridan Ross P.C.

(57) ABSTRACT

Applications that use non-volatile random access memory (NVRAM), such as those that apply file system journal writes and database log writes where write operations apply data sequentially over the NVRAM, map the available capacity of the NVRAM in a virtual address space without compromising performance. The NVRAM is segmented into regions with multiple such regions fitting within a volatile RAM element accessible to the application and the NVRAM. One or more regions are loaded in the volatile RAM and reflected in page tables that reference the regions. The page tables are managed on a host computer executing the application. One region space in the volatile RAM is unused and available for transferred information. Mechanisms are provided for dynamically transferring regions and interfacing with the host computer. As the application sequentially accesses information in the stored regions, older regions are removed and new regions loaded from NVRAM to the volatile RAM.

20 Claims, 14 Drawing Sheets

(56) References Cited

U.S. PATENT DOCUMENTS

| | | | | |
|---|---|---|---|---|
| 6,009,466 | A | * | 12/1999 | Axberg .................... G06F 8/34 709/220 |
| 6,253,240 | B1 | * | 6/2001 | Axberg .................... G06F 8/34 709/223 |
| 6,289,375 | B1 | * | 9/2001 | Knight ................ H04L 67/1097 707/999.001 |
| 6,446,209 | B2 | * | 9/2002 | Kern ....................... G06F 21/10 713/164 |
| 6,467,022 | B1 | | 10/2002 | Buckland et al. |
| 8,601,100 | B2 | | 12/2013 | Holzmann |
| 2001/0052073 | A1 | * | 12/2001 | Kern ....................... G06F 21/10 713/161 |
| 2007/0294459 | A1 | | 12/2007 | Chen |
| 2009/0083051 | A1 | * | 3/2009 | Bokor .................... G06Q 30/06 705/1.1 |
| 2009/0083052 | A1 | * | 3/2009 | Bokor .................... G06Q 30/06 705/1.1 |
| 2009/0116641 | A1 | * | 5/2009 | Bokor .................... H04L 63/061 380/44 |
| 2009/0119605 | A1 | * | 5/2009 | Bokor .................... G06F 21/604 715/757 |
| 2009/0144638 | A1 | * | 6/2009 | Haggar .................. G06N 3/006 715/757 |
| 2009/0267938 | A1 | * | 10/2009 | Nicol, II ................ A63F 13/12 345/419 |
| 2010/0042776 | A1 | * | 2/2010 | Seo ....................... G06F 12/123 711/103 |
| 2010/0179871 | A1 | * | 7/2010 | Smith ..................... G06Q 10/10 705/14.34 |
| 2011/0173395 | A1 | * | 7/2011 | Bhattacharjee ........ G05D 23/19 711/135 |
| 2012/0124189 | A1 | * | 5/2012 | Haggar .................. G06N 3/006 709/223 |
| 2013/0198460 | A1 | * | 8/2013 | Ochi ...................... G06F 12/121 711/133 |
| 2013/0297885 | A1 | * | 11/2013 | Hyde, II ............... G06F 12/122 711/136 |
| 2013/0297886 | A1 | * | 11/2013 | Hyde, II ............... G06F 12/122 711/136 |
| 2013/0311721 | A1 | * | 11/2013 | Yoshihara ........... G06F 12/0246 711/122 |
| 2013/0346689 | A1 | * | 12/2013 | Araki ................... G06F 12/0871 711/113 |

OTHER PUBLICATIONS

Isreal Koren, "Replacement Policy Simulator Help", Sep. 20, 2006, pp. 1-3, https://web.archive.org/web/20060920215817/http://www.ecs.umass.edu/ece/koren/architecture/RepPolicies/replacement_policy_simulator_help.htm.*

Webopedia, "Paging", Aug. 9, 2002, pp. 1-2, https://web.archive.org/web/20020809123737/http://www.webopedia.com/TERM/P/paging.html.*

* cited by examiner

SYSTEM, METHOD AND COMPUTER-READABLE MEDIUM FOR DYNAMICALLY MAPPING A NON-VOLATILE MEMORY STORE

TECHNICAL FIELD

The invention relates generally to data storage systems and, more specifically, to a data driver for interacting with data storage systems that include volatile and non-volatile memory elements.

BACKGROUND

Some conventional computing systems employ a non-volatile memory device, such as, a not AND or NAND logic-gate based flash memory together with a volatile random access memory (RAM) to reduce write operation latency for write operations from a host application. NAND-type flash memory has been deployed in main memories, memory cards, universal serial bus (USB) flash drives, and solid-state drives for general storage and in some designs to facilitate the transfer of data between devices. Other examples of non-volatile memory include read-only memory (ROM), ferro-electric RAM (F-RAM), magnetic computer storage devices (including hard disk drives, floppy disks, and magnetic tape), optical disks and early data storage methods such as paper tape and punched cards.

FIG. 1 illustrates an implementation of such a conventional storage system 10 supported by a host computer 12 and data storage elements in a host bus adapter (HBA) 20. The central processor unit (CPU) 14 of the host computer 12 accesses a volatile RAM 22 via a memory bus or a standard input/output (I/O) bus 15 for peripheral devices (e.g., the peripheral component interconnect express (PCIe)). A power supply (not shown) coupled to the HBA 20 may be supplemented by a battery or batteries that are available to power the HBA 20 in case the AC power is interrupted to the power supply. The battery or batteries ensure that HBA 20 has sufficient time to transfer data in the volatile RAM 22 to a non-volatile storage element 26. Once power has been restored to the HBA 20, the information stored in the non-volatile storage element 26 can be copied or moved into the volatile RAM 22.

The HBA 20 further includes a direct memory access (DMA) engine 24 that allows the microcontroller 28 to access system memory (i.e., one or both of the RAM 22 and the non-volatile storage element 26) independent of the CPU 14. In some embodiments, the microcontroller 28 enables or controls data transfers via an interface 29 to and from one or more data volume(s) 30 stored in a redundant array of independent disks (RAID). An application, executing in the host computer's CPU 14, accesses the RAM 22 in the HBA 20 in accordance with a standard operating system process that maps or associates a host memory address to a physical address in the RAM 22.

FIG. 2 illustrates a conventional memory managed environment 40 illustrating relationships between a virtual address space 50, a page table 62, and pages 72a-72h stored in the RAM 22. The set of all memory addresses in the operating system executing on the host computer 12 identifies an address space. In the illustrated arrangement, a virtual address space 50 includes a set of regions 52a-52h identified by an initial address X and a region offset.

As illustrated, a memory management unit (MMU) 60 generates and manages the page table 62. The page table 62 includes a location identifier or a page identifier 64a-64h and a corresponding indicator or flag 66a-66h. The indicator or flag 66a-66h identifies whether valid data is present at the corresponding location or region 72a-72h of storage addresses in the RAM 22. Once the relationships between entries in the page table 62 are established with the pages 72a-72h stored in the RAM 22, the RAM 22 is "mapped" to the virtual address space 50 and the information stored therein is available for direct access by an application executing on the host computer 12. Such direct accesses are known to boost performance for relatively small write operations to the RAM 22.

The described RAM access methodology functions well when a translation is available for an application identified virtual address and when application memory requirements are smaller than the capacity available in the DRAM. However, there are circumstances where application memory requirements cannot be supported in the available RAM. When faced with such a situation, RAM capacity can be increased until a maximum capacity supported by the storage device design is reached. Although a system design may support additional RAM, such an addition of storage capacity may not be desirable in the light of the increase in procurement costs and later operational costs due to increased power demands on the data storage device. RAM capacity can also be restricted by addressable storage constraints introduced by the basic input/output system (BIOS) installed in the firmware of the host computer.

It would be desirable to provide an improved system and method for processing information without compromising the performance benefit associated with the use of a combination of volatile and non-volatile storage elements in a data store.

SUMMARY

Embodiments of systems and methods for improving the performance of sequential I/O operations such as those performed by large file system journal or database log writes as directed by a host computer to a data store supported by both volatile and non-volatile storage elements are illustrated and described.

In an exemplary embodiment, a method for dynamically managing a virtual address space in a host is illustrated and described. The virtual address space corresponds to data accessible to a host bus adapter coupled to a host computer. The method includes the steps of initializing a paging table in the host to correspond to a first portion of available storage capacity of a volatile memory element coupled to the host bus adapter, the first portion of the volatile memory element containing first information stored in a non-volatile memory element coupled to the volatile memory element. When an application executing in the host computer requests access to a page or block of information that is not present in the volatile memory element a processor in the host issues a page fault, the method continues by instructing the host bus adapter to transfer second information from a region of a non-volatile memory element to a second portion of the volatile memory element, the second information defining a most recently transferred region and including the page that is not present in the volatile memory element as defined by the page fault, modifying the paging table to include a reference to the most recently transferred region and updating the virtual address space to reflect the reference in the paging table.

An example system includes a host computer including an operating system and at least one executing application. The system further includes an input/output bus coupled to the host computer and a bus adapter that supports a data store, the bus adapter having a non-volatile memory element and a volatile memory element coupled to each other via an adapter bus. The host computer supports an address space that corresponds to the capacity of the non-volatile memory element in the bus adapter and a paging table that corresponds to a first portion of available storage capacity of the volatile memory element. The first portion of the volatile memory element contains first information from the non-volatile memory element. When the at least one executing application requests access to a page that is not present in the volatile memory element, as indicated by the paging table, the host computer instructs the bus adapter to transfer second information from a region of a non-volatile memory element to a second portion of the volatile memory element. The second information defines a most recently transferred region and includes the page that is not present in the volatile memory element. The host computer modifies the paging table to include a reference to the most recently transferred region and updates the address space to reflect the reference in the paging table.

In another exemplary embodiment, a computer-readable medium includes stored instructions in a non-transitory form that, when executed on a processing system of a host computer, direct the host computer to: partition a non-volatile memory element coupled via a host bus adapter into M regions, where multiple such regions can be stored in a volatile memory element coupled to the non-volatile memory element via an input/output bus, partition the volatile memory element into N regions where M and N are integers, execute a host application that loads N−1 regions from the non-volatile memory element to the volatile memory element, and while accessing information from one of the N−1 regions of the volatile memory element, the host computer directs the transfer of a subsequent region from the non-volatile memory to an $N^{th}$ region of the volatile memory element and further directs a return transfer of an oldest region present in the volatile memory element to a corresponding region of the non-volatile memory element to produce a vacant region in the volatile memory element. Thereafter, the instructions direct the host computer to update respective presence indicators in the paging table corresponding to completion of the transfer of the subsequent region and the return transfer to reflect the information in the volatile memory element.

WRITTEN DESCRIPTION OF ILLUSTRATIVE EMBODIMENTS

Figure 1:
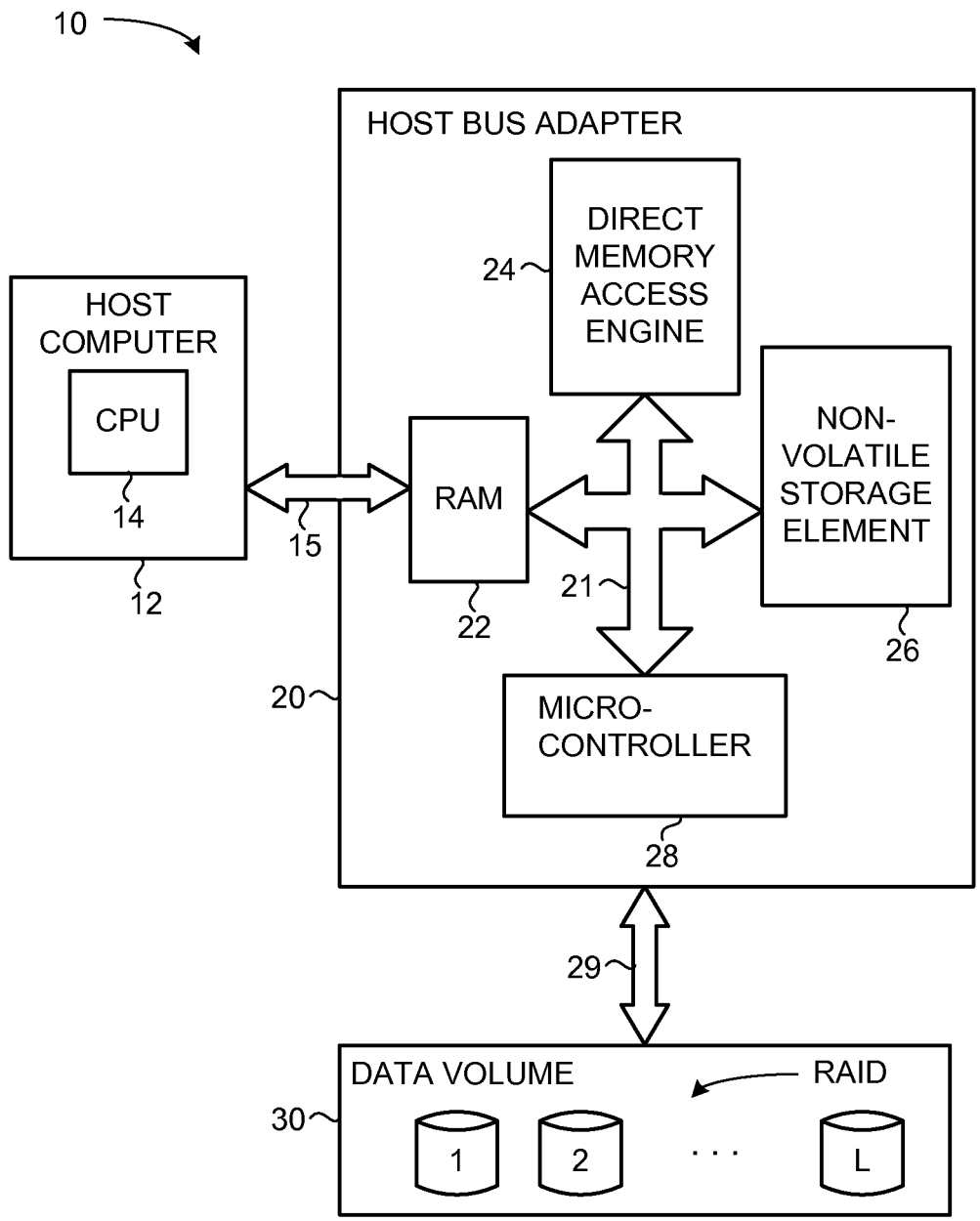
FIG. 1 is a block diagram illustrating a conventional storage system.
Figure 2:
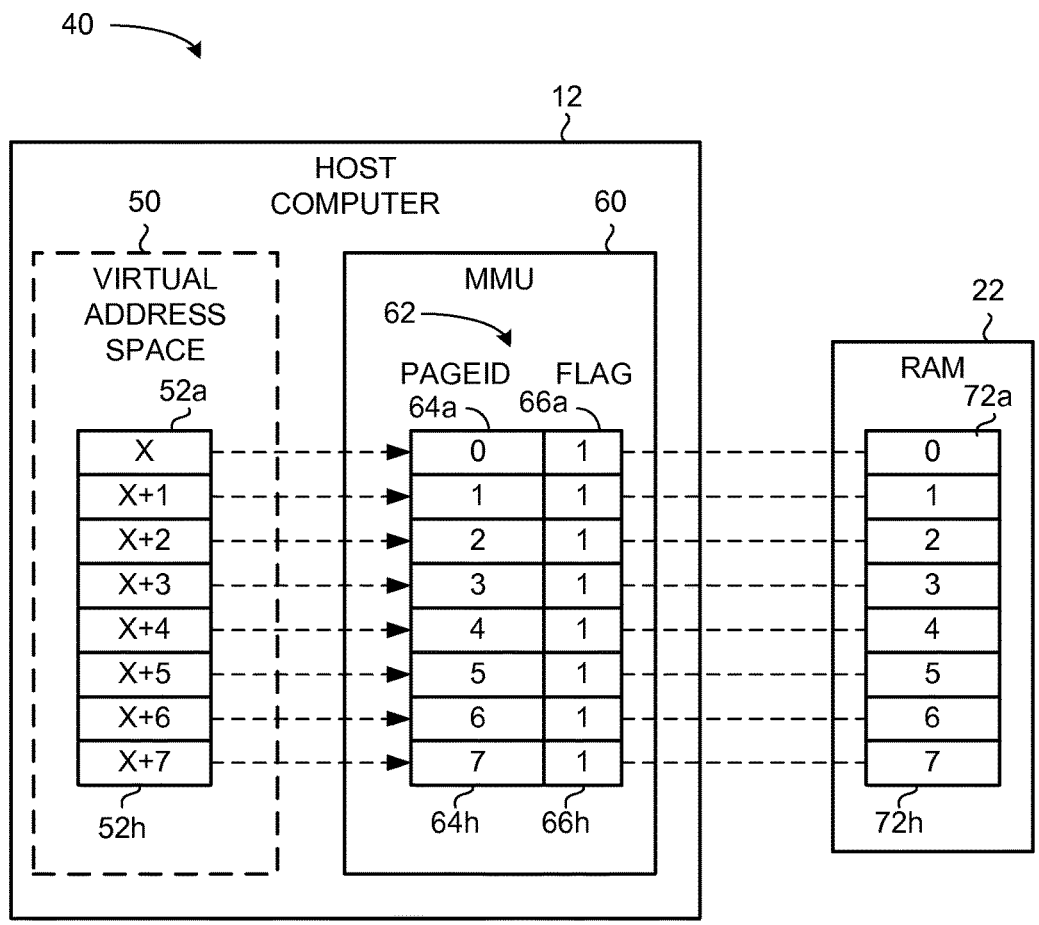
FIG. 2 is a block diagram illustrating an address space that is mapped to a volatile memory element in the storage system of FIG. 1.

In the exemplary embodiments, an application executing in the host computer can map a non-volatile memory element coupled to host computer via a host bus adapter without compromising performance. The non-volatile memory element is logically partitioned into regions. A group or set of suitably sized regions of the non-volatile memory can fit into the available storage capacity of a volatile memory element coupled to the host bus adapter. One or more of the regions are loaded into the volatile memory element and a page table in the host is updated to associate addressable locations to the regions loaded in the volatile memory element. At least one region space is unmapped and unused in the volatile memory element. When the application in the host computer desires a significantly large number of sequential accesses to the information stored in the non-volatile memory element. For example, when implementing a journal supporting a large journaling file system or managing a database log, the application will sequentially access the regions loaded into the volatile DRAM. After one or more of the regions stored in the volatile DRAM are no longer needed, these older regions are transferred from the volatile DRAM to the non-volatile memory and subsequent regions in the non-volatile memory element are transferred into the recently vacated regions of the volatile DRAM.

In an example embodiment for dynamically mapping a non-volatile memory store, a HBA is modified to provide interface commands to the host system. A LOAD_PAGES command transfers a desired number of pages or blocks of information from a region of the non-volatile memory element to the volatile memory element. The LOAD_PAGES command supports a set of parameters including a region identifier, a page identifier, a count (i.e., an integer number of pages to transfer) and a DRAM address. Similarly, a SAVE_PAGES command transfers a desired number of pages or blocks of information from the volatile memory element to the non-volatile memory element. Preferably, only the "dirty" or modified pages (identified from the attributes of the CPU page table entry) or blocks of information are saved or transferred to the non-volatile memory element.

In this first example embodiment, the operating system of the host loads the first N−1 regions from the non-volatile memory element to the volatile memory element. In addition, the host operating system configures a paging table for the entire capacity of the non-volatile data store. However, only the pages for the first N−1 regions are marked or supported by a valid mapping. That is, only the first N−1 regions in the volatile memory element are identified in the paging table with a corresponding page identifier and a flag indicating that the page is present in the volatile memory and available to the application.

When the application attempts to access a page or block of information from the $N^{th}$ region of the non-volatile storage element, the memory management unit of the host computer will identify a page fault or miss and the operating system will load or transfer the missing information from the $N^{th}$ region of the non-volatile memory element into the previously unused portion of the volatile memory element. Upon completion of the load or transfer, the application will access the $N^{th}$ region of the volatile memory element. The operating system executing on the host computer is further modified to proactively transfer out the oldest region from the volatile memory element to the non-volatile memory element and update the memory map. Once the oldest region in the volatile memory element has been transferred or saved to the non-volatile memory element, the next subsequent region of the non-volatile memory can be transferred to the volatile memory element. The process can be repeated as desired. Once the end of non-volatile memory is reached, it wraps around and it transfers from the first region. The process further ensures that until the application exhausts the entire capacity of the volatile memory element, there is no performance penalty for mapping operations.

In an alternative embodiment, a user library is introduced. The user library masks the operating system map functions from the application. The application interface to the library consists of allocation, write and read commands. An advantage of the alternative embodiment over the first example embodiment is the library obviates or avoids changes to the operating system. The allocation command partitions the non-volatile memory element into regions, loads the initial regions into the volatile memory element, and directs the operating system to update the memory map. In this embodiment, the memory map is not configured with entries for regions that are not loaded in the volatile memory element.

For a write operation, when the application accesses a region already mapped, the library will return to the application upon completion of the write to the appropriate location(s) in the volatile memory element. Otherwise, the library will load the region into unused space of the volatile memory element and modify the map to reflect the change. Subsequently, the library initiates a background thread for an unmap operation. The unmap operation saves the oldest region in the volatile memory element to the non-volatile memory element and updates the map to reflect the change. Optionally, the unmap operation can proactively transfer all "old" (i.e., already accessed) regions from the volatile memory element, load the subsequent regions from non-volatile memory element to the vacant space of volatile memory element and update the map to reflect the change, accordingly. Once the end of volatile memory is reached, the unmap operation will wrap around and load from the first region.

Both embodiments ensure that the application can access extremely large non-volatile storage capacities while setting up and updating page table entries only after the application has written to the entire storage capacity of the volatile memory element.

Figure 3:
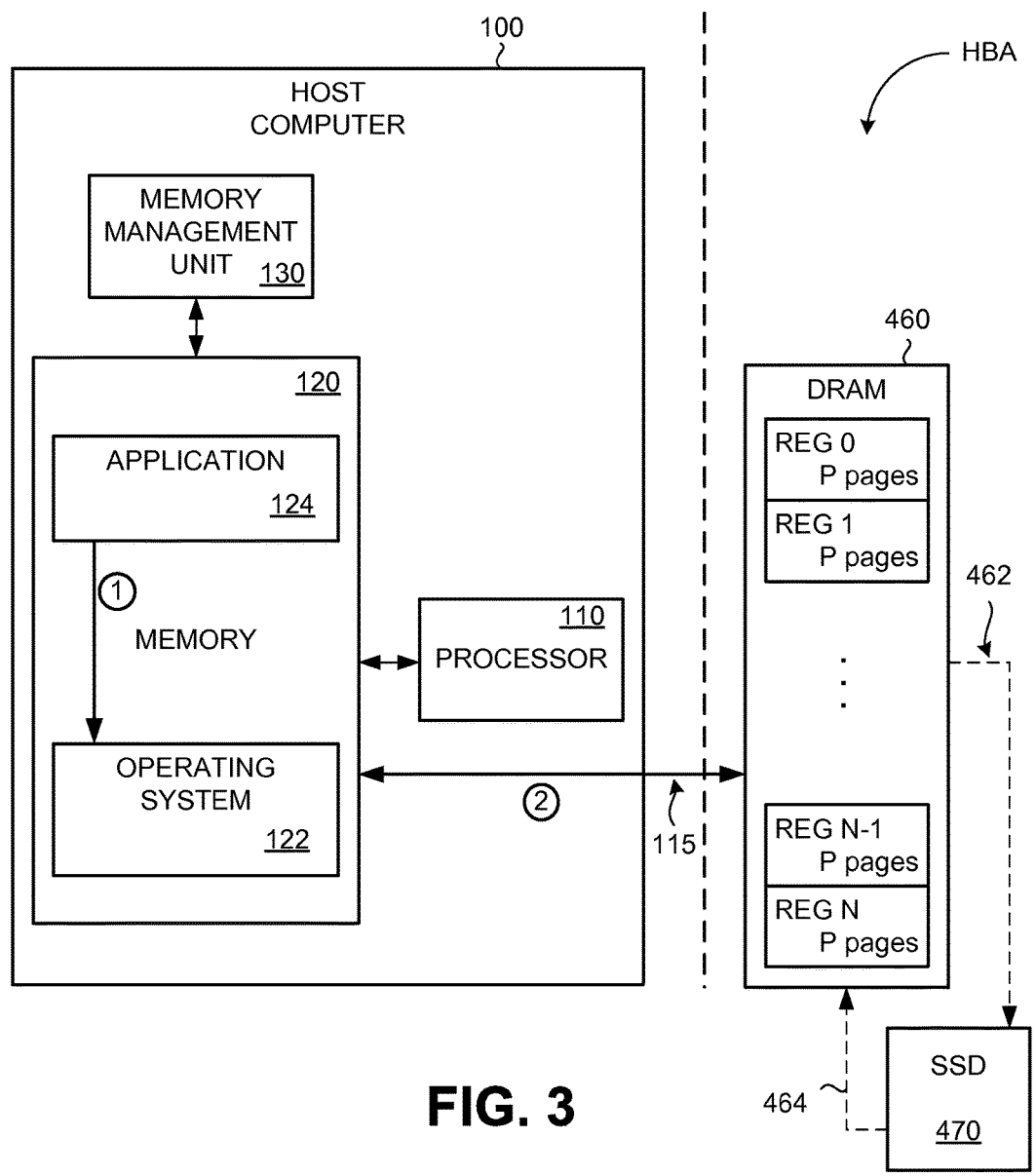
FIG. 3 is a schematic illustration of an embodiment of an improved storage system.

FIG. 3 is a schematic illustration of an embodiment of an improved storage system. The improved storage system includes a host computer 100 coupled to a RAM 460 via an input/output (I/O) bus or a peripheral bus such as a PCIe bus. As described the RAM 460 may be part of a storage controller in a HBA. The volatile storage element 460 is shown as a DRAM. It should be understood that the volatile storage element is not so limited and may be implemented using alternative volatile storage technologies. The non-volatile storage element 470 is shown as a solid-state drive or SSD. It should be understood that the non-volatile storage element 470 is not so limited and may be implemented with other non-volatile storage technologies. The host computer 100 includes a processor 110, a memory 120 and a memory management unit (MMU) 130. The memory 120 includes instructions that when executed by the processor 110 support an operating system 122 and at least one application 124. In this example embodiment, the application interface is not modified. As indicated by the arrow labeled "1," the application 124 uses an operating system provided service to map the contents of the DRAM 460 in the HBA. The DRAM 460 is logically subdivided into N regions of P pages, where N and P are positive integers. Each of the N regions corresponds to one or more pages. An $N^{th}$ or last region in a set of sequentially ordered regions mapped by the application 124 is left unused. After the map is populated, the application 124 can directly access the DRAM 460, as shown by the arrow labeled "2."

The HBA provides a set of commands that enable the operating system 122 on the host computer 100 to dynamically manage data transfers between the volatile information stored in the DRAM 460 and a non-volatile memory element or elements accessible via the HBA. The set of commands includes a LOAD_PAGES command and a SAVE_PAGES command. The LOAD_PAGES command transfers a desired number of pages (i.e., a count) from a designated location or region of the non-volatile memory element 470 to a designated location or address in the DRAM 460. The LOAD_PAGES command includes a set of parameters. The parameters include a region identifier, a page identifier, a count, and a DRAM address. The SAVE_PAGES command transfers a desired number of pages (i.e., a count) from a designated location or address in the DRAM 460 to a designated location or address in the non-volatile memory element 470. The SAVE_PAGES command includes the same parameters as the LOAD_PAGES command. As shown and described in association with FIGS. 4-7, the application 124 can map a non-volatile memory element having a storage capacity that exceeds that provided in the DRAM 460.

Figure 4:
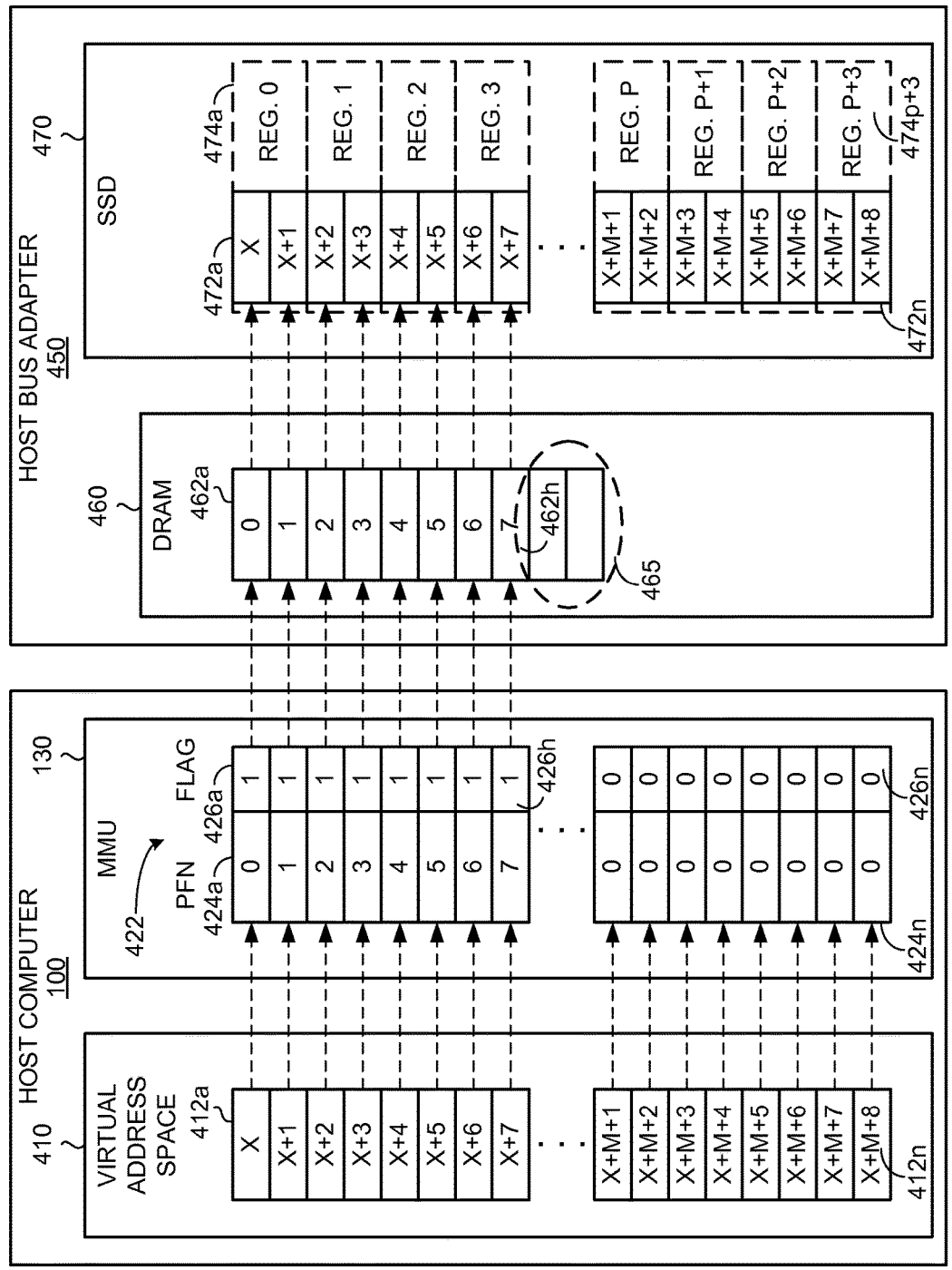
FIG. 4 is a schematic illustration of the host computer and the data store of FIG. 3.

FIG. 4 is a schematic illustration of an embodiment of the host computer 100 and the HBA of FIG. 3. The schematic illustration reflects the state of the host computer 100 and the memory elements coupled to the HBA 450 after the operating system 122 loads the first N−1 regions from the SSD 470 into corresponding memory locations of the DRAM 460, when the DRAM 460 can hold N total regions of information. The host computer 100 generates and manages a virtual address space 410 that includes a set of pages 412a-412n. Each member of the set of pages 412 can be defined as a function of a base address labeled "X." A first or primary page 412a is labeled with the base address (i.e., "X"). A next subsequent page 412b is labeled with the base address and an offset (i.e., "X+1"). This addressing scheme is continued over the storage capacity of the non-volatile memory element 470 in the HBA 450. The MMU 130 in the host computer 100 generates and manages a page table 422, which includes an identifier or page frame number 424 and a corresponding flag 426 or indicator that reflects when information is present in a corresponding location of the DRAM 460.

As illustrated, the memory map includes entries for the entire storage capacity of a non-volatile memory element such as the solid state drive (SSD) 470 in the HBA 450. As indicated in FIG. 4, the page table 422 includes entries for page frame numbers 424a-424n corresponding to the number of pages available over the storage capacity of the SSD 470 coupled to the HBA 450. Those page frame number entries that correspond to locations within the storage capacity of the DRAM 460, a volatile memory element coupled to the HBA 450, are populated with a page frame number 424 and a flag 426 or bit that shows that corresponding information is present in the DRAM 460 and available for access by the application 124. The page table 422 includes additional entries (presently unused) corresponding to the pages of the SSD 470 that are not loaded to DRAM 460. As indicated in FIG. 4, these locations in the page table 422 include no information and the flag is not set (i.e., the corresponding presence bits are set to "0."

As further illustrated in FIG. 4, a first portion of the storage capacity of the DRAM 460 is logically subdivided into pages 462a-462h. A second or remaining portion of the DRAM 460 remains unused. The storage capacity of the second or remaining portion 465 corresponds to a region of the SSD 470. The SSD 470 is subdivided into pages 472a-472n and regions 474a-474p+3 corresponding to the storage capacity of the SSD 470, which is available to the application 124 via the memory map and the dynamic transfer mechanisms that enable the operating system 122 to programmatically direct data transfers between the SSD 470 and the DRAM 460. In this illustrated embodiment, each region 474 corresponds to two pages 472 in the SSD 470 and two pages 462 of the DRAM 460. As indicated in FIG. 4, each page 412 in the virtual address space 410 corresponds to a page frame number 424 and a flag 426 in the page table 422 of the MMU 420. As also indicated in FIG. 4, the described entries in the virtual address space 410 and page table 422 correspond to a page 462 in the DRAM 460 and a page 472 of the SSD 470. When the page table 422 is as illustrated in FIG. 4, the application 124 can access the N−1 regions of the information from the DRAM 460 or pages 0-7, which information corresponds to the information in regions 0-3 474a-474d of the SSD 470.

Figure 5:
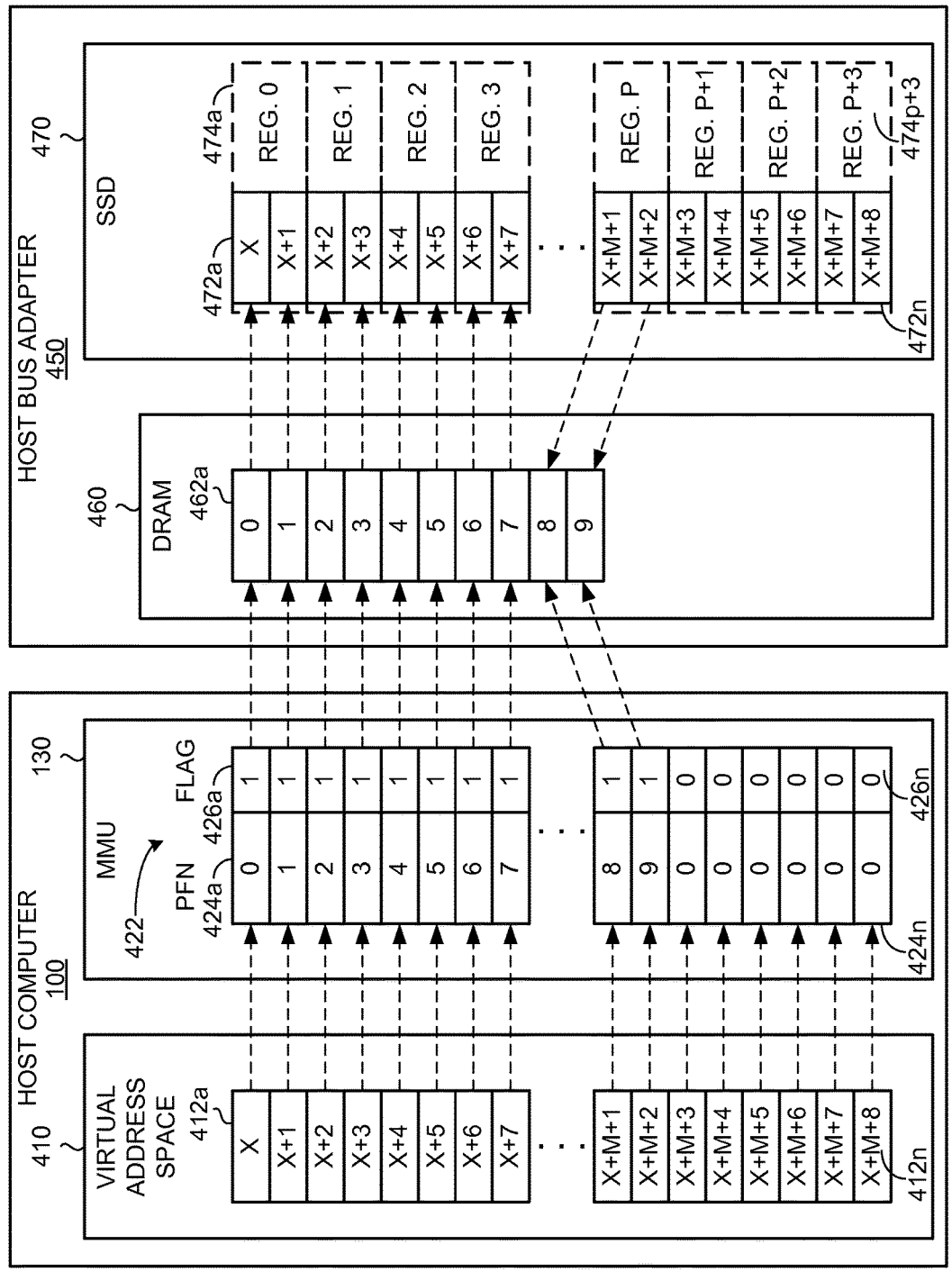
FIG. 5 is a schematic illustration of a state of the host computer and data store of FIG. 3 after a page fault.

FIG. 5 is a schematic illustration of a state of the host computer 100 and HBA 450 of FIG. 3 after a page fault. When the application 124 attempts to access information from any region which is not loaded in DRAM 460, which for a sequential write operation will correspond to region 4, the host computer MMU 130 will communicate a page fault to the processor 110. In response, the operating system 122 will direct a LOAD_PAGES command to the HBA 470, which will transfer the identified region from the SSD to the unused portion 465 in the DRAM 460. In the illustrated embodiment in FIG. 5, the host computer 100 requires information stored in a page corresponding to region P of the SSD 470. Thus, pages X+M+1 and X+M+2 are loaded or transferred to the previously unused region in the DRAM 460. In addition, the operating system 122 will direct the MMU 130 to manipulate the page table entries (i.e., page 8 and page 9) such that these next two page entries point to corresponding pages (page 8 and page 9) in the unused region 465 of the DRAM 460. Once the described LOAD_PAGES command is complete and the page tables entries have been adjusted as indicated, the application 124 can continue to access the information corresponding to the recently transferred region (i.e., region P) of the SSD 470.

Figure 6:
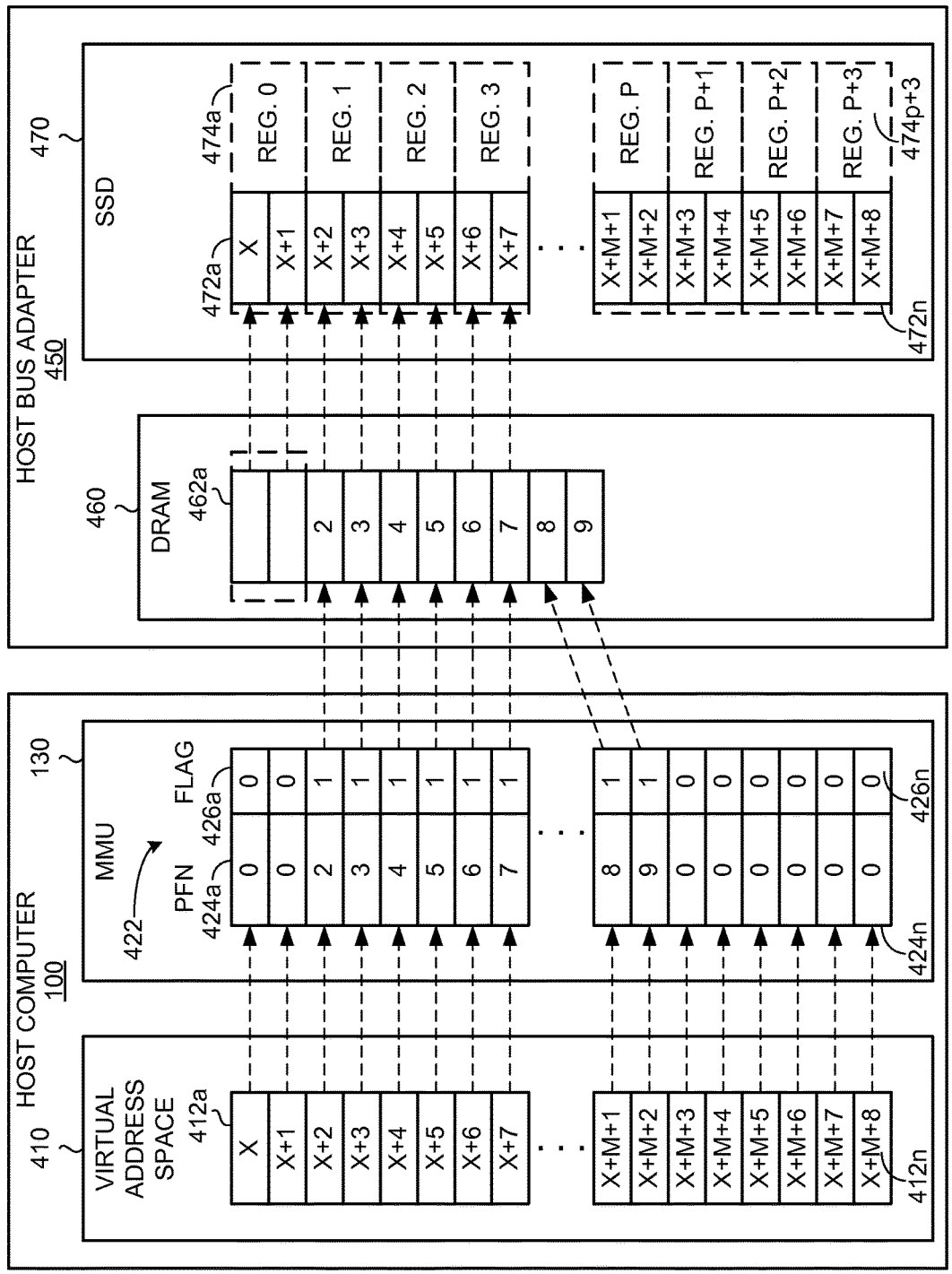
FIG. 6 is a schematic illustration of a subsequent state of the host computer and the data store of FIG. 3 after an oldest region in the DRAM is transferred to the non-volatile memory element of the data store of FIG. 3.

While the application 124 is accessing the most recently transferred region of the SSD 470 from the corresponding page locations of the DRAM 460, the operating system 122 proactively starts transferring out the oldest region from the DRAM 460 to the corresponding page locations in the SSD 470. FIG. 6 is a schematic illustration of a subsequent state of the host computer 100 and the HBA 450 of FIG. 3 after an oldest region in the DRAM 460 is transferred to the SSD 470. As shown, the information in page 462a and 462b is moved to page 472a and page 472b, respectively. The MMU entry 424a and 424b and respective flag entries 426a and 426b are updated to show that the region 0 is no longer available in DRAM 460.

Figure 7:
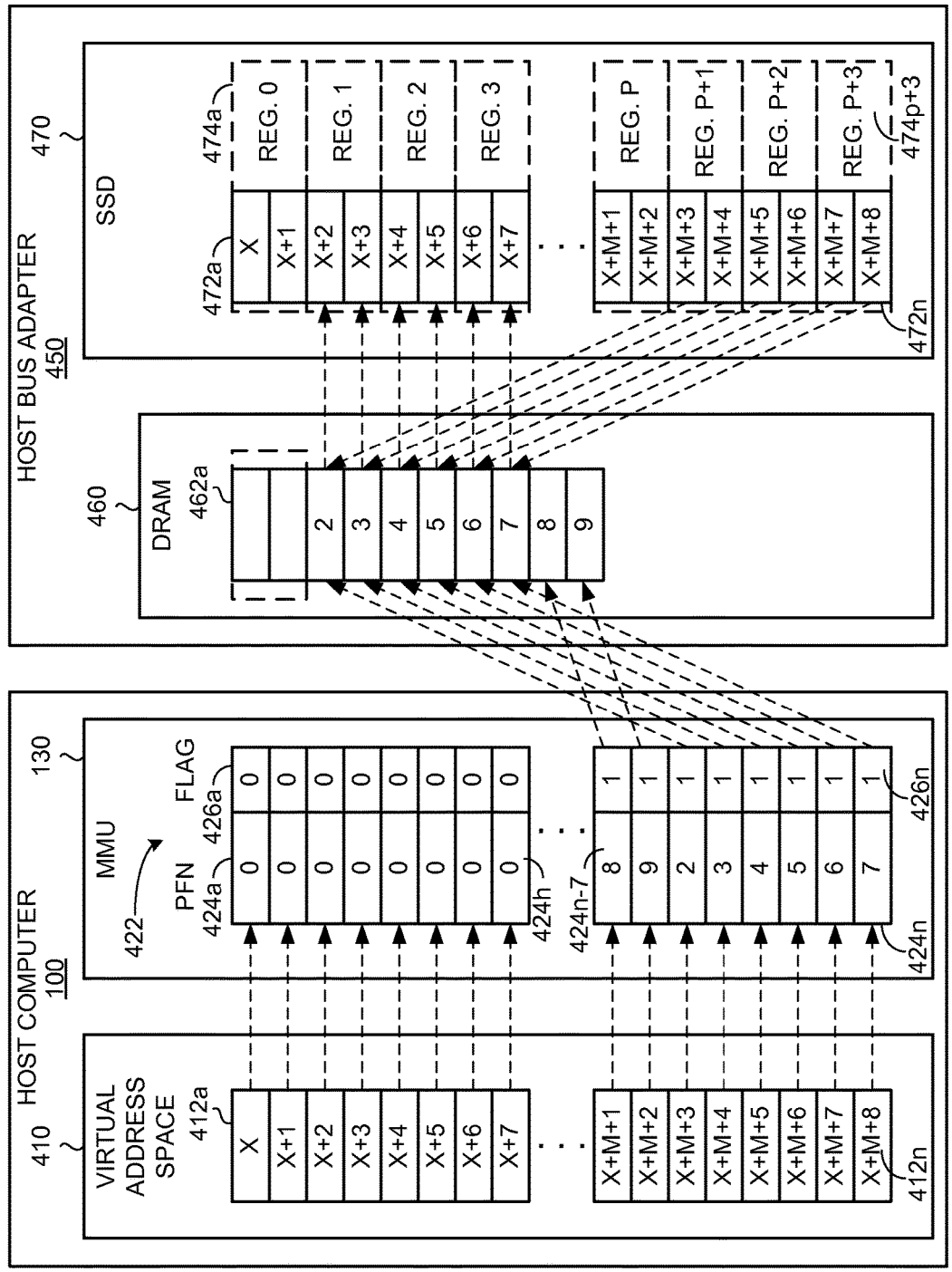
FIG. 7 is a schematic illustration of a background load of subsequent regions from the non-volatile memory element to the volatile memory element of the data store of FIG. 3.

In addition, the operating system 122 of the host computer 100 can also transfer the contents from the other previously accessed regions of the DRAM 460 to corresponding regions in the SSD 470. FIG. 7 provides a schematic illustration of a background SAVE_PAGES command directed to the next oldest and already accessed regions of the DRAM 460 followed by an update in the MMU 130 to show that the information in the pages 424c through 424h is no longer available. This is followed by a LOAD_PAGES command directed to the next subsequent regions from the SSD 470 and an update in the MMU 130 to show that the pages from 424n-7 to 424n are now available. As indicated by the rightward facing arrows in FIG. 7, pages 2 through 7 in the DRAM 460 are moved by the SAVE_PAGES command to the pages labeled X+2 through X+7 (corresponding to regions 1-3) in the SSD 470. In addition, in accordance with a LOAD_PAGES command, the information in pages X+M+3 through X+M+8 of the SSD 470 are transferred to the recently vacated pages 2 through 7 in the DRAM 460. This ensures that until the application 124 accesses the entire storage capacity of the DRAM 460, any overhead associated with a page mapping operation is avoided.

Figure 8:
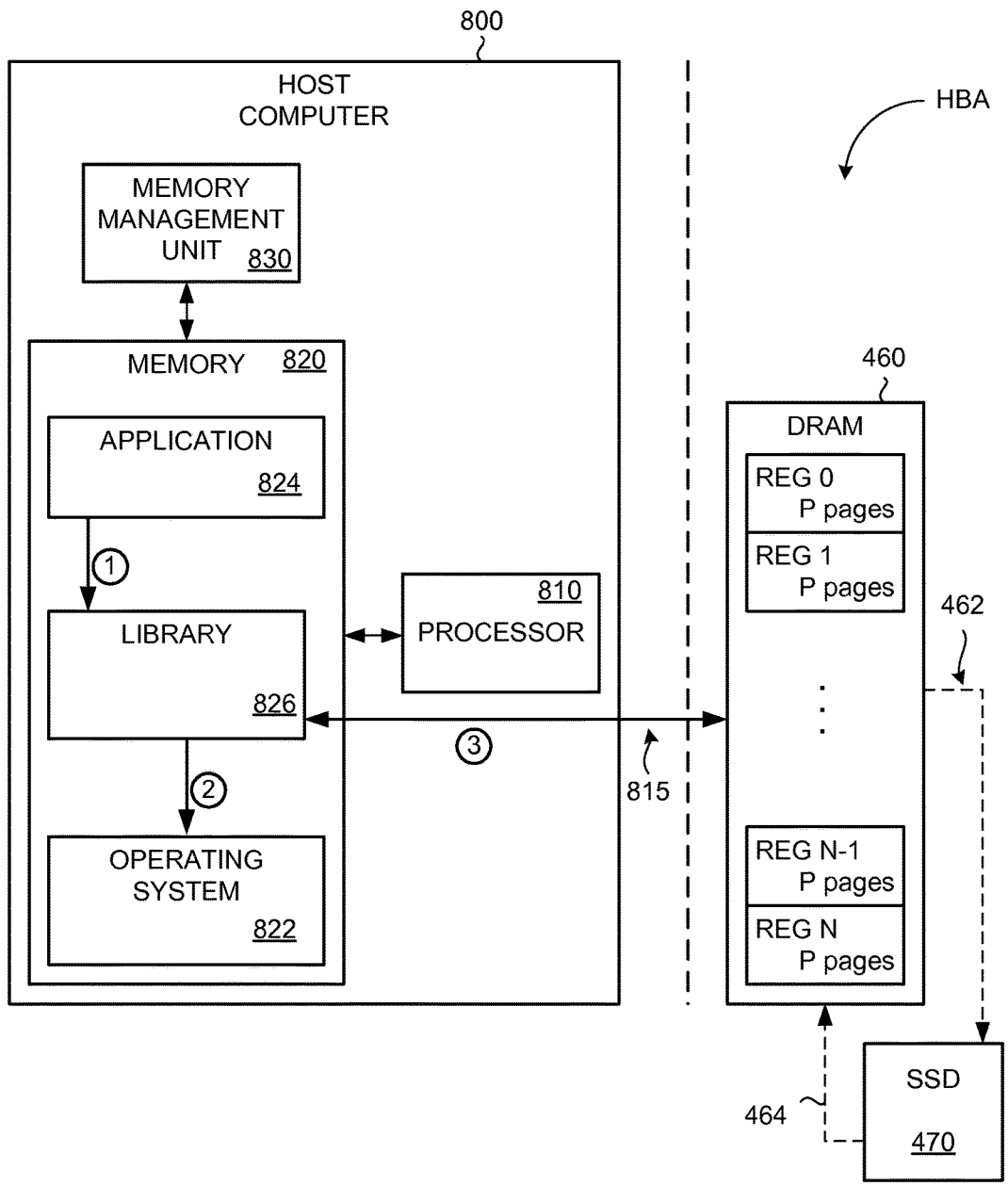
FIG. 8 is a schematic illustration of an alternative embodiment of an improved storage system.

FIG. 8 is a schematic illustration of an alternative embodiment of an improved storage system. The improved storage system includes a host computer 800 coupled to a DRAM 460 via an input/output (I/O) bus 115 or a peripheral bus such as a PCIe bus. As described, the DRAM 460 may be part of a storage controller in a HBA 450. The host computer 800 includes a processor 810, a memory 820 and a memory management unit (MMU) 830. The memory 820 includes instructions that when executed by the processor 810 support an operating system 822, at least one application 824, and a library 826. In this example embodiment, the application interface is modified to use the library 826. As indicated by the arrow labeled "1," the application 824 generates and forwards a storage allocation command to the library 826. Thereafter, the application 824 sends appropriately configured read or write commands to the library 826, which communicates with the HBA 450 to perform the directed memory operation.

The library 826 logically divides or partitions the DRAM 460 and the SSD 470 into pages. As with the previous embodiment, the SSD 470 is partitioned into N regions of P pages, where N and P are positive integers. Each of the N regions corresponds to one or more pages. A $P^{th}$ or last region in a set of sequentially ordered regions are loaded by the library 826 to DRAM 460 and mapped by the standard operating system 822 services, as shown by the arrow labeled "2." The library 826 hides the operating system map functionality from the application 124. That is, the library 826 manages the direct access commands to the DRAM 460, as indicated by the arrow labeled "3."

An advantage of the present embodiment over the embodiment described in association with FIG. 3 is that the operating system 822 requires no modification. The library allocation command instructs the library 826 to logically partition the SSD 470 and loads a first set of regions into the DRAM 460. The library 826 further generates the map as indicated in the pseudo-code included in Table 1.

Figure 9:
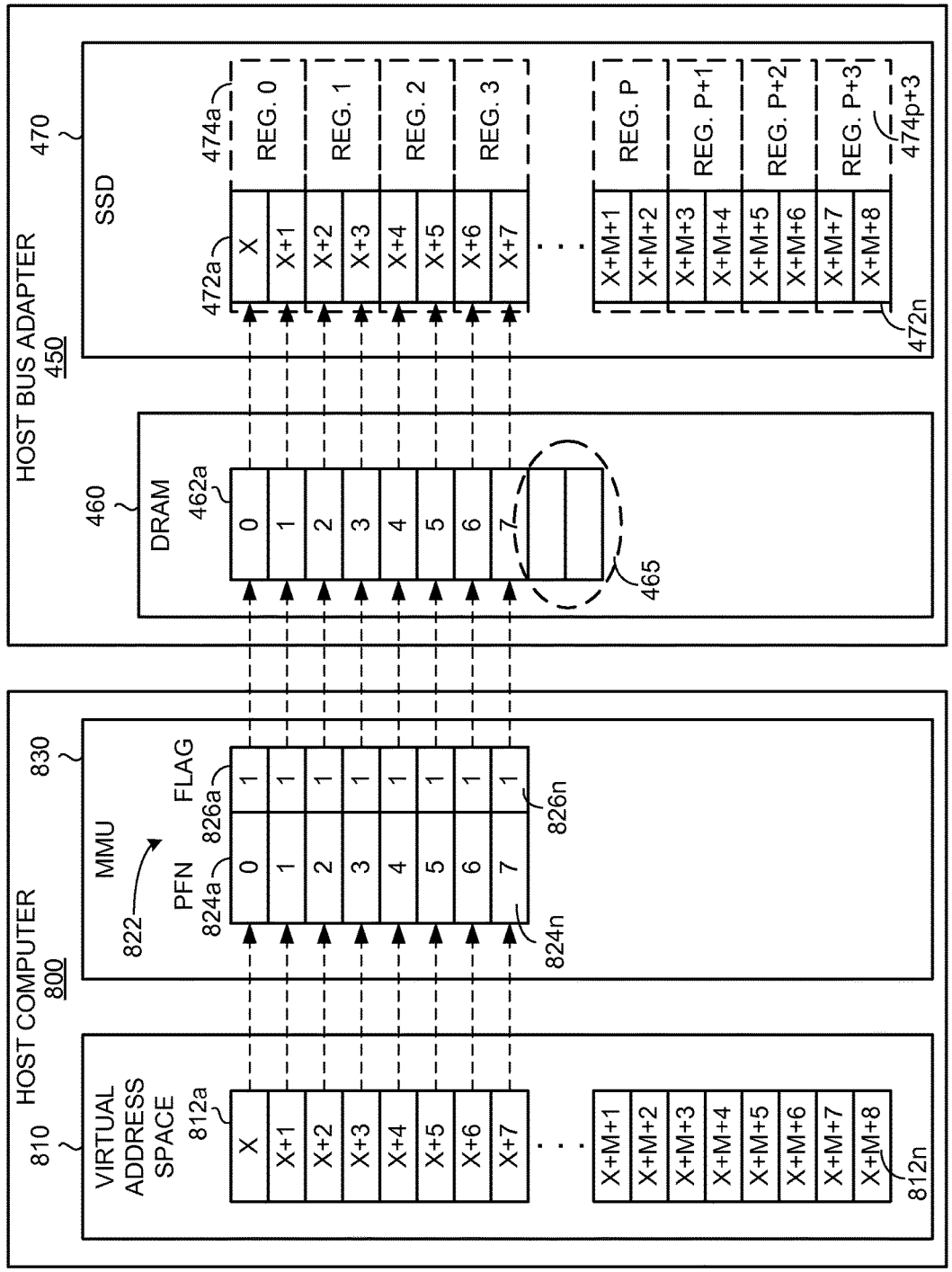
FIG. 9 is a schematic illustration of the host computer and data store of FIG. 8.

TABLE 1 lib_alloc:
. . .
LOAD_PAGES(. . .);
. . .
int fd = open ("/dev/<device name>", O_WR, 0);
char *nv_ptr = (volatile char *) mmap (NULL, <DRAM size>, PROT_WRITE, MAP_SHARED, fd, <offset>);
. . .
return nv_ptr;

The state of the page table 822 and mapping after a lib_alloc command is illustrated in FIG. 9. Note that the page table 822 does not include invalid page table entries for regions of the SSD 470 that are not loaded in the DRAM 460. The schematic illustration reflects the state of the host computer 800 and the memory elements coupled to the HBA 450 after the library 826 loads the first N−1 regions from the SSD 470 into corresponding memory locations of the DRAM 460. The host computer 800 generates and manages a virtual address space 810 that includes a set of pages 812a-812n. Each member of the set of pages 812 can be defined as a function of a base address labeled "X." A first or primary page 812a is labeled with the base address (i.e., "X"). A next subsequent page 812b is labeled with the base address and an offset (i.e., "X+1"). This addressing scheme is continued over the storage capacity of the non-volatile memory element 470 in the HBA 450. The MMU 830 in the host computer 800 generates and manages a page table 822, which includes an identifier or page frame number 824 and a corresponding flag 826 or indicator that reflects when information is present in a corresponding location of the DRAM 460.

As illustrated, the memory map includes entries for the entire storage capacity of the DRAM 460 in the HBA 450. As indicated in FIG. 9, the page table 822 includes entries for page frame numbers 824a-824n corresponding to the number of pages available over the storage capacity of the DRAM 460 coupled to the HBA 450. Those page frame number entries that correspond to locations within the storage capacity of the DRAM 460, a volatile memory element coupled to the HBA 450, are populated with a page frame number 824 and a flag 826 or bit that shows that corresponding information is present in the DRAM 460 and available for access by the application 824.

As further illustrated in FIG. 9, a first portion of the storage capacity of the DRAM 460 is logically subdivided into pages 462a-462h. A second or remaining portion 465 of the DRAM 460 remains unused. The storage capacity of the second or remaining portion 465 corresponds to a region of the SSD 470. The SSD 470 is subdivided into pages 472a-472n and regions 474a-474p+3 corresponding to the storage capacity of the SSD 470, which is available to the application 824 via the library 826. In this illustrated embodiment, each region 474 corresponds to two pages 472 in the SSD 470 and two pages 462 of the DRAM 460. As also indicated in FIG. 9, the described entries in the virtual address space 810 and page table 822 correspond to a page 462 in the DRAM 460 and a page 472 of the SSD 470. When the page table 822 is as illustrated in FIG. 9, the application 824 can access the first N−1 regions of the information from the DRAM 460 or pages 0-7, which information corresponds to the information in regions 0-3 474a-474d of the SSD 470.

TABLE 2 lib_write or lib_read:
. . .
If region is mapped then
    direct access
    return
Load_page of the needed region into the unused region
    nv_ptr = (volatile char *) mmap (NULL, <DRAM size>, PROT_WRITE, MAP_SHARED, fd, <offset>);
    do the direct access
. . .
trigger background task for unmap
return Application 824 will use library 826 interfaces like lib_write or lib_read to perform a write or read access to the DRAM 460. When the application 824 attempts to access information from any region outside of the range of pages loaded into the N−1 regions of the DRAM 460, which for a sequential write operation will correspond to region 4, lib_write will transfer the identified region from the SSD 470 to the unused portion 465 in the DRAM 460.

Figure 10:
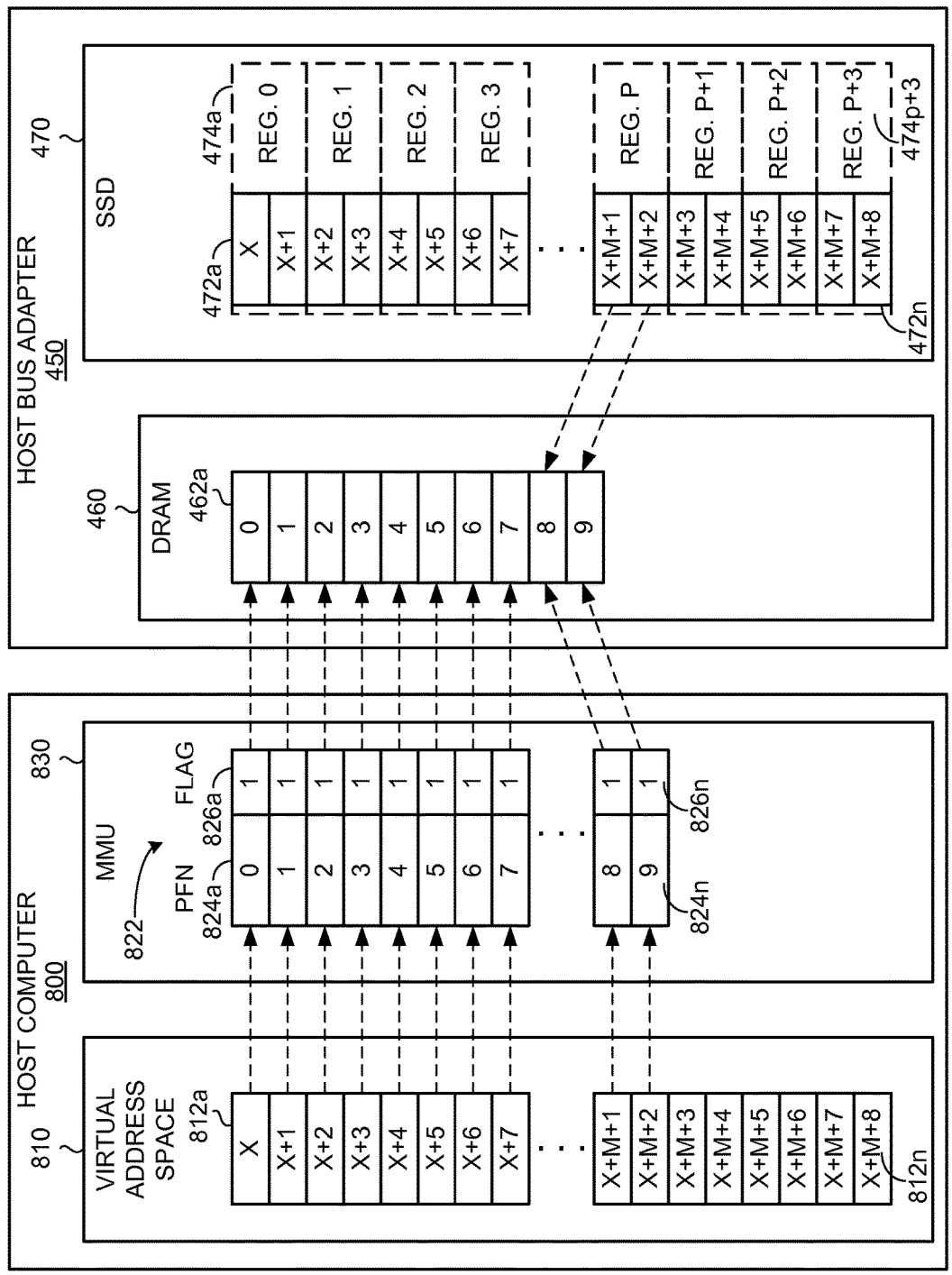
FIG. 10 is a schematic illustration of the host computer and data store of FIG. 8 after a region of the non-volatile memory element is loaded into the volatile memory element.

FIG. 10 is a schematic illustration of the state of the page table 822 and mapping relationships after the lib_write, as described in pseudo-code in Table 2, loads a region of the SSD 470 into the DRAM 460. In the illustrated embodiment in FIG. 10, the host computer 800 requires information stored in a page corresponding to region P of the SSD 470. Thus, pages X+M+1 and X+M+2 are loaded or transferred to the previously unused region in the DRAM 460. In addition, the library 826 directs the MMU 820 to manipulate the page table entries (i.e., page 8 and page 9) using standard operating system interface such that these next two page entries point to corresponding pages (page 8 and page 9) in the unused region 465 of the DRAM 460. Once the page table entries have been adjusted as indicated, lib_write can complete the access to the information corresponding to the recently transferred region (i.e., region P) of the SSD 470.

While the application 824 is accessing the most recently transferred region of the SSD 470 from the corresponding page locations of the DRAM 460, the library 826 generates and performs an unmap thread that saves the oldest region in the DRAM 460 to corresponding page locations in the SSD 470. Table 3 includes pseudo-code describing an unmap operation.

Figure 11:
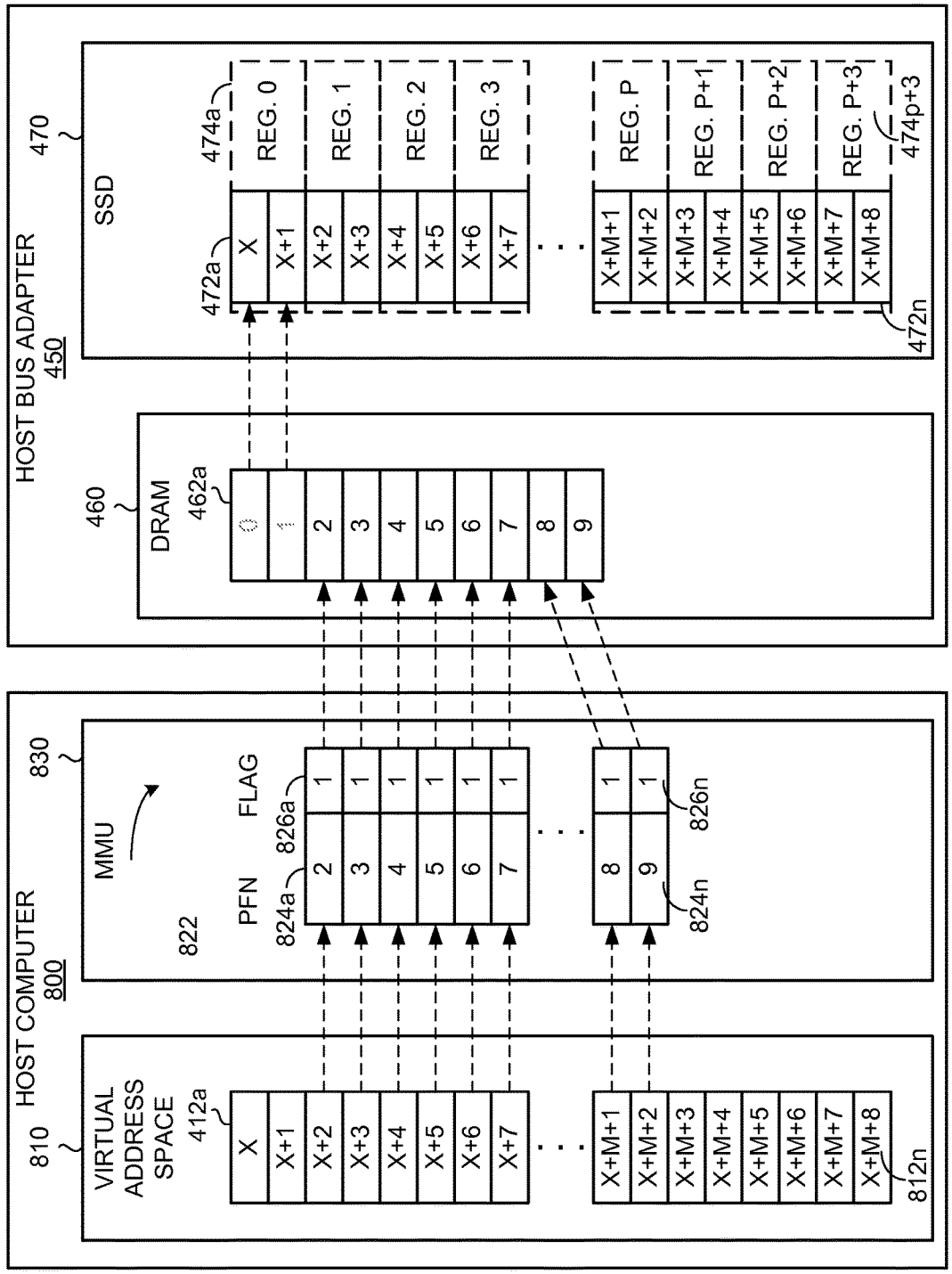
FIG. 11 is a schematic illustration of the host computer and data store of FIG. 8 after a background unmap operation.

TABLE 3 lib_thread_unmap:
. . .
Pick the oldest region
    save_page the region from DRAM to SSD
    unmap the region
return;

FIG. 11 is a schematic illustration of the host computer 800 and HBA 450 after a background unmap operation. As shown, the information in page 462a and 462b is moved to page 472a and page 472b, respectively. In addition, the library 826 of the host computer 800 can also optionally transfer the contents from the other previously accessed regions of the DRAM 460 to corresponding regions in the SSD 470. Table 4 includes pseudo-code describing an optional unmap operation with proactive save and load of regions.

TABLE 4

```
lib_thread_unmap:
   ...
   Pick the oldest region
      save_page the region from DRAM to SSD
      unmap the region
   ...
   Optionally:
      save_page for all the old regions from DRAM to SSD
      unmap the old regions
      load_page the subsequent regions from SSD to DRAM
      map the new regions
   return;
```

Figure 12:
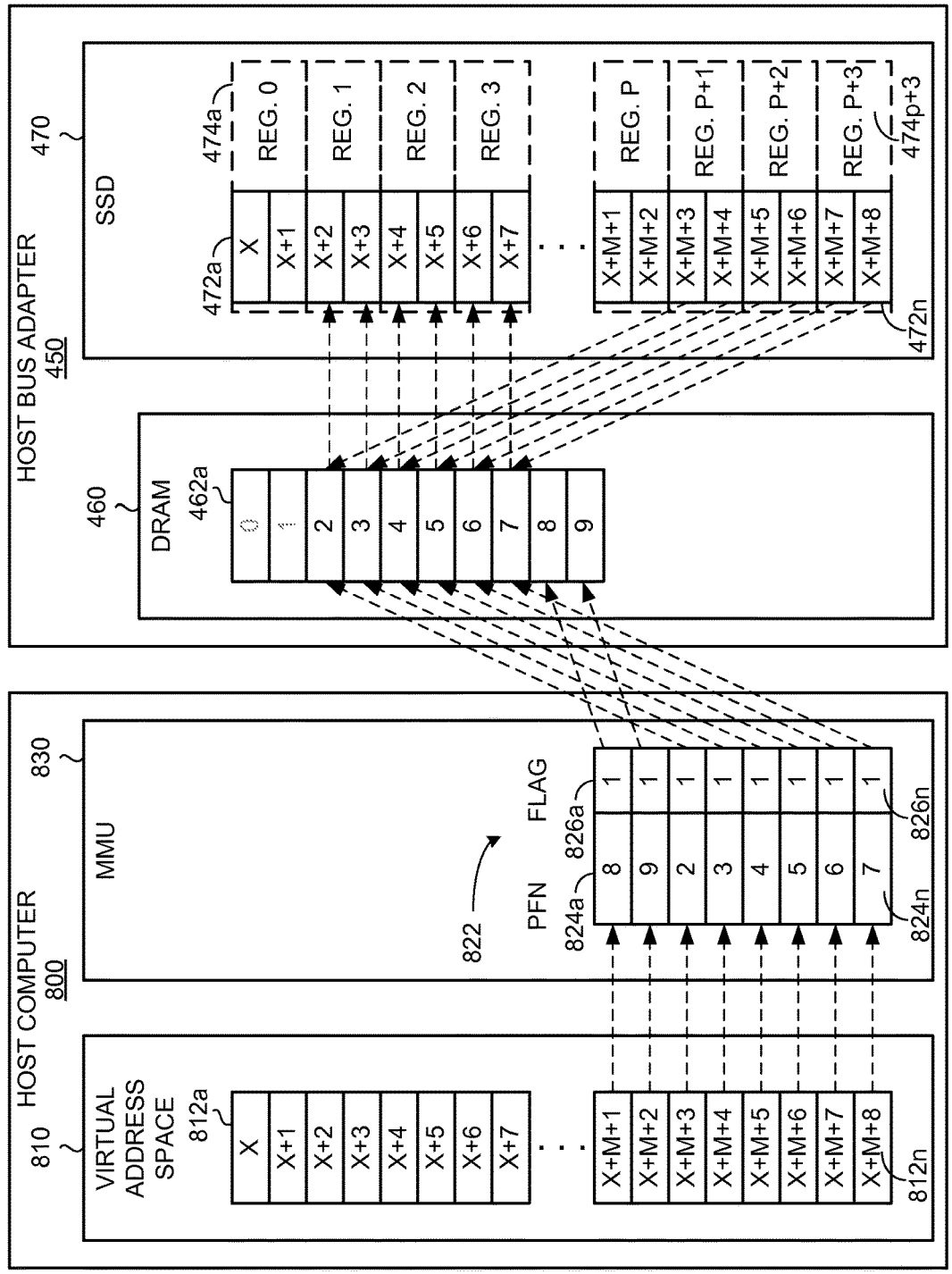
FIG. 12 is a schematic illustration of the host computer and data store of FIG. 8 after a proactive save and load of multiple regions.

FIG. 12 is a schematic illustration of the host computer and data store of FIG. 8 after a proactive save and load of multiple regions. As indicated by the rightward facing arrows in FIG. 12, pages 2 through 7 in the DRAM 460 are moved by the optional lib_thread_unmap command issued by the library 826 to the pages labeled X+2 through X+7 (corresponding to regions 1-3) in the SSD 470. This is followed by triggering a standard operating system interface to update the MMU page table 822 to remove mapping of these pages which got removed from the DRAM 460. Next, the information in pages X+M+3 through X+M+8 of the SSD 470 are transferred to the recently vacated pages 2 through 7 in the DRAM 460. This is followed by triggering a standard operating system interface to update the page table 822 in the MMU 830 to show the information now present in the DRAM 460 is available to the application 824. This ensures that until the application 824 accesses the entire storage capacity of the DRAM 460, any overhead associated with a page mapping operation is avoided.

In a preliminary initialization process (not shown) a paging table is initialized in a host to correspond to a first portion of the available storage capacity of a volatile memory element coupled to a host bus adapter. The first portion of the volatile memory element contains information from a non-volatile memory element coupled to the volatile memory element. Once this preliminary initialization is complete, the paging table is stored or otherwise recorded and available to a processor in the host, a runtime behavior is implemented in the flow diagram of FIG. 13.

As presented in the illustrated embodiment, a method 1300 for dynamically managing a virtual address space in a host begins with block 1302, where when an application executing in the host triggers a page fault by requesting information that is not present in the volatile memory element, the host computer instructs the host bus adapter to transfer information from a region of the non-volatile memory element to a different unused portion of the volatile memory element. The information defines a most recently transferred region and includes the page or block of information that was not present in the volatile memory element immediately prior to the transfer operation. Thereafter, substantially simultaneously or together with the transfer in block 1302, the host computer modifies the paging table to include a reference to the most recently transferred region, as shown in block 1304. In block 1306, the host computer updates a virtual memory space to reflect the modified paging table. Thereafter, as indicated in decision block 1308, a determination is made as to whether the storage capacity of the volatile memory element is exhausted. When additional storage capacity is available, as indicated by the arrow labeled "No," exiting decision block 1308, the method 1300 terminates. Otherwise, when the storage capacity of the volatile storage element is exhausted, as indicated by the arrow labeled "Yes," exiting decision block 1308, the method continues with block 1310, where the host computer directs the HBA to transfer one or more pages from the volatile memory element to the non-volatile memory element. Thereafter, substantially simultaneously or together with the transfer of block 1310, the host computer updates the page table, as shown in block 1312.

Figure 13:
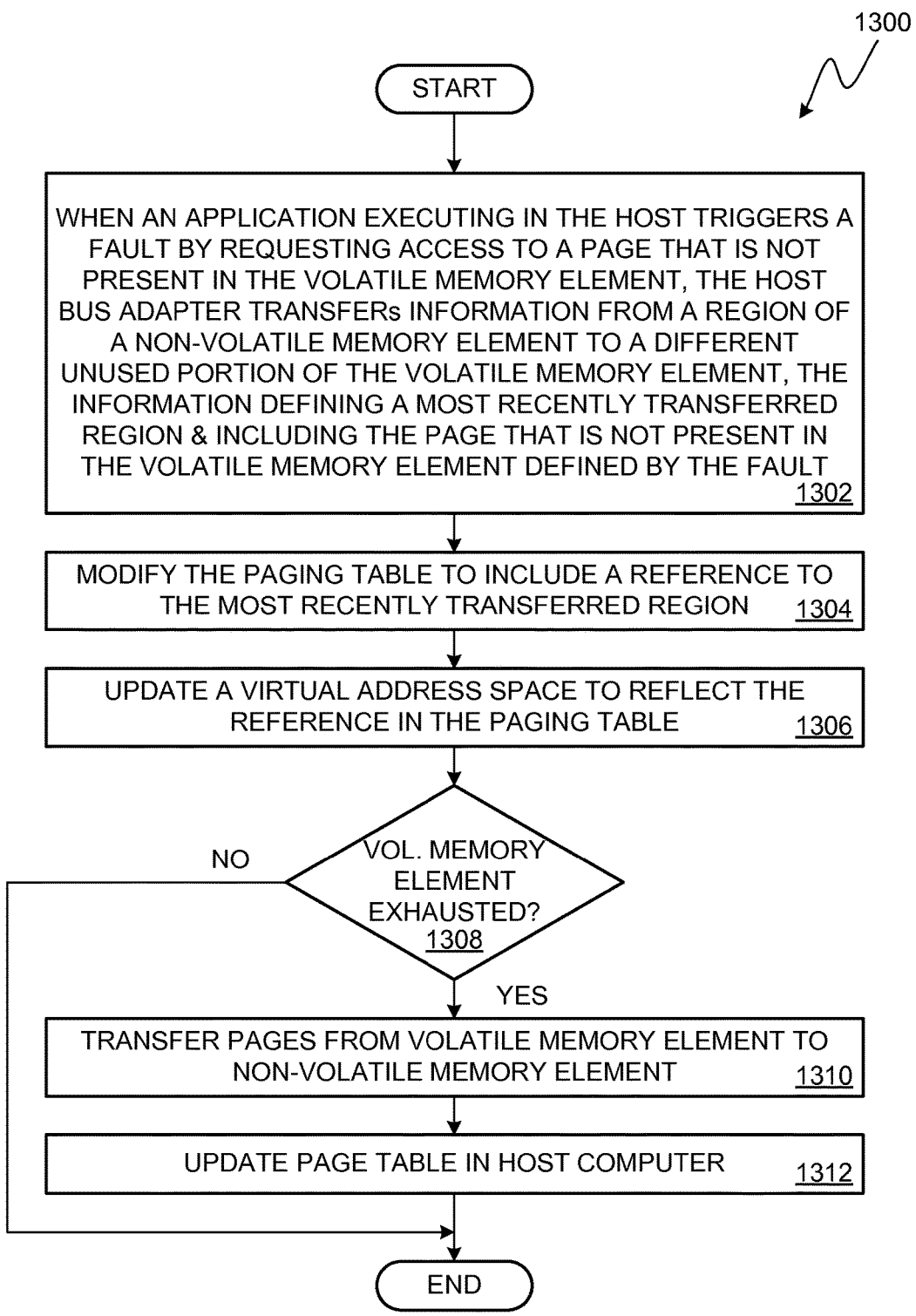
FIG. 13 includes a flow diagram illustrating a method for dynamically managing a virtual address space in a host.

It should be understood that the flow diagrams of FIG. 13 is intended only to be exemplary or illustrative of the logic underlying the described method. Persons skilled in the art will understand that in various embodiments, data processing systems including host computers and peripheral controllers such as a HBA can be programmed or configured in any of various ways to implement the described methods. The steps or acts described above can occur in any suitable order or sequence, including in parallel or asynchronously with each other. Steps or acts described above with regard to FIG. 13 can be combined with steps or acts described in other embodiments or in some cases omitted from some embodiments. Although depicted for purposes of clarity in the form of a flow diagram in FIG. 13, the underlying logic can be modularized or otherwise arranged in any suitable manner. Persons skilled in the art will readily be capable of programming or configuring suitable software or suitable logic, such as in the form of an application-specific integrated circuit (ASIC) or similar device or combination of devices, to effect the above-described methods. Also, it should be understood that the combination of software instructions or similar logic and the local memory 120, the memory 820 or other memory elements in which such software instructions or similar logic is stored or embodied for execution by processor 110 or the processor 810, comprises a "computer-readable medium" or "computer program product" as that term is used in the patent lexicon.

Figure 14:
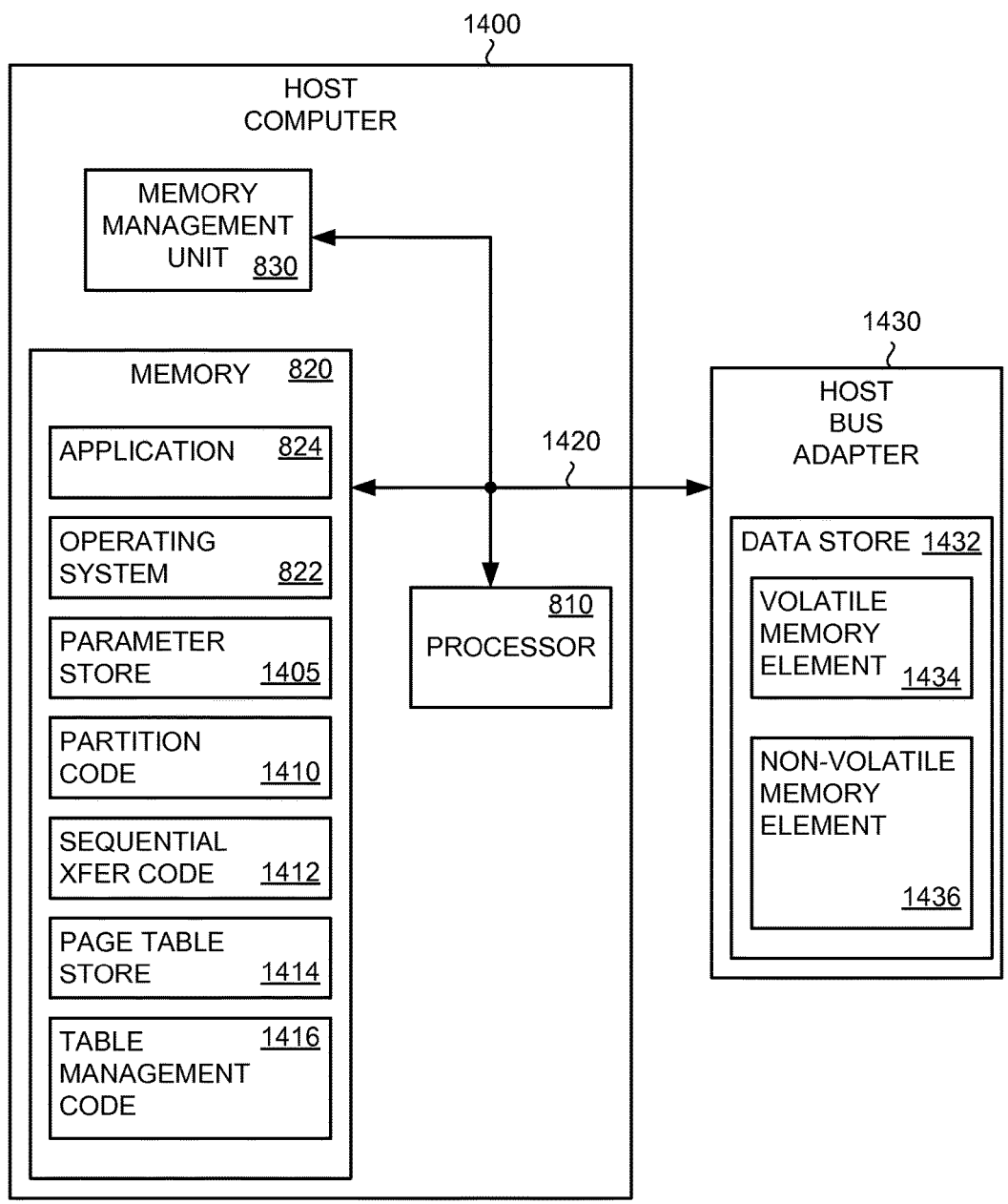
FIG. 14 is a schematic illustration of an embodiment of a computer-readable medium accessible to a host computer.

FIG. 14 is a schematic illustration of an embodiment of a storage system including a host computer 1400 coupled to a HBA 1430. As illustrated, the HBA 1430 supports a data store or data volume 1432 that is exposed to the host computer 1400 via bus 1420. The HBA 1430 supports the data volume 1432 with one or more volatile memory elements such as volatile memory element 1434 and one or more non-volatile memory elements such as volatile memory elements 1436. As described, the volatile memory element 1434 is a DRAM or any other volatile memory technology, while the non-volatile memory element 1436 is a SSD or any other non-volatile memory technology.

The host computer 1400 includes a processor 810, a memory management unit 830 and a memory 820. As further illustrated the memory 820 stores processor executable instructions, scripts and data arranged in various entities. For example, the memory 820 includes an operating system 822 that is loaded and executed on the processor 810. The operating system 822 is a collection of executable instructions that manages the basic hardware resources including I/O functions of the host computer 1400. In addition, the operating system 822 provides services such as scheduling services, file management, etc. for supporting applications such as application 824.

The application 824 is a collection of executable instructions or modules of such instructions that perform desired tasks. As described, the application 824 includes one or modules that desires to perform a write operation in a sequential order. Such sequential write operations that exceed the storage capacity of a volatile memory element include database logs and or logs associated with a journaling file system, among others.

Also included in the memory 820 is a parameter store 1405, partition code 1410, sequential transfer code 1412, a page table store 1414, and page table management code 1416. The parameter store 1405 records a set of default numerical or other measurable factors that defines a system or sets the conditions of its operation. Partition code 1410 includes executable instructions that when executed by a processor coordinate the relative placement and size of regions and pages within the addressable storage capacity of data storage elements associated with the HBA. The partition code or logic 1410 may include rules and algorithms for calculating optimum sizes and placement to ensure common sizes for regions and pages in the host computer and in the HBA. The rules or algorithms further ensure that one or more page can fit within a region.

The sequential transfer code 1412 includes executable instructions that when executed by a microprocessor or controller in the HBA transfer the stored information from defined regions and/or pages of the non-volatile memory element 1436 to designated addressable locations in the volatile memory element 1434 and vice-versa. As described in one embodiment, the sequential transfer code 1412 includes load and save commands used by the operating system 822 to support the application 824. In an alternative embodiment, a library 826 that supports allocation, read, and write operations provides the sequential transfer code.

The page table store 1414 provides storage capacity for the MMU 830 of the host computer 1400 to dynamically track the status of pages presently stored in the volatile memory element 1434 of the HBA 1430. The table management code 1416 includes executable instructions that when executed by the processor 810, manipulate the content of the page table, i.e., the page identifiers and the presence bit or flag to reflect the information presently stored in the volatile memory element. 1434.

It should be noted that the systems and methods have been described with reference to one or more exemplary embodiments for the purpose of demonstrating principles and concepts of operation. The systems and methods are not limited to these embodiments. As will be understood by persons skilled in the art, in view of the description provided herein, many variations may be made to the embodiments described herein and all such variations are within the scope of the systems and methods as defined in the claims.

What is claimed is:

1. A method for dynamically managing a virtual address space disposed in a host, the virtual address space corresponding to data accessible to a host bus adapter for the host, the method comprising:
    initializing a paging table which is disposed in the host to correspond to a first portion of available storage capacity of a volatile memory element coupled to the host bus adapter, the first portion of the volatile memory element containing first information stored in a non-volatile memory element, wherein the method further includes:
    when an application executing in the host triggers a fault by requesting access to a page that is not present in the volatile memory element;
        instructing the host bus adapter to transfer second information from a region of the non-volatile memory element to a second portion of the volatile memory element, the second information defining a most recently transferred region and including the page that is not present in the volatile memory element as defined by the fault;
    modifying the paging table to include a reference to the most recently transferred region; and
    updating the virtual address space to reflect the reference in the paging table.

2. The method of claim 1, wherein initializing the paging table comprises:
    dividing the volatile memory element into N regions of similar capacity, where N is a positive integer; and
    dividing the non-volatile memory element into M regions of similar capacity, where M is a positive integer greater than N.

3. The method of claim 2, wherein initializing the paging table further comprises:
    providing in the paging table M paging table entries, including one paging table entry for each of the M regions of the non-volatile memory element; and
    updating a presence indicator in the paging table for N−1 regions in the volatile memory element.

4. The method of claim 3, further comprising:
    accessing information from the N−1 regions of the volatile memory element.

5. The method of claim 4, further comprising:
    while accessing information from a first region of the volatile memory element, the first region being a most recently transferred region of the volatile memory element, transferring information from a second region, the second region being a previously accessed region of the volatile memory element, to the non-volatile memory element to produce a vacant region in the volatile memory element, where the second region is a different region that the first region.

6. The method of claim 5, wherein transferring the information from the second region of the volatile memory element to the non-volatile memory element comprises identifying an oldest region present in the volatile memory element.

7. The method of claim 6, further comprising:
    updating a presence indicator in the paging table corresponding to the vacant region in the volatile memory element.

8. The method of claim 7, further comprising:
    identifying a subsequent region from the non-volatile memory element;
    transferring information stored in the subsequent region of the non-volatile memory element to the vacant region in the volatile memory element to generate transferred information; and
    updating the paging table to reflect the transferred information in the volatile memory element.

9. The method of claim 8, wherein overhead of transferring regions from the volatile memory element to the non-volatile memory element, associated with updating page mapping information in the paging table, occurs only once the capacity of the volatile memory element is exhausted.

10. The method of claim 1, wherein an operating system executing in the host directs the instructing, modifying, and updating operations.

11. The method of claim 10, wherein a user library located between the application and the operating system executing on the host provides an interface to the volatile memory element.

12. The method of claim 11, wherein the user library receives requests selected from a group consisting of allocate, read, and write from the application.

13. The method of claim 12, wherein the user library issues commands that include information for managing a virtual memory map to the operating system.

14. A system, comprising:
a host computer including an operating system and at least one executing application; and
an input/output bus coupled to the host computer and coupled to a bus adapter that supports a data store, the bus adapter having a non-volatile memory element and a volatile memory element coupled to each other via an adapter bus,
   the host computer supporting an address space that corresponds to the capacity of the non-volatile memory element in the bus adapter, and supporting a paging table, which is disposed in the host computer, that corresponds to a first portion of available storage capacity of the volatile memory element,
   the first portion of the volatile memory element containing first information from the non-volatile memory element,
   wherein when the at least one executing application requests access to a page that is not present in the volatile memory element, as indicated by the paging table the host computer:
      instructs the bus adapter to transfer second information from a region of the non-volatile memory element to a second portion of the volatile memory element, the second information defining a most recently transferred region of the non-volatile memory element and including the page that is not present in the volatile memory element, and the host computer modifies the paging table which is disposed in the host computer to include a reference to the most recently transferred region of the non-volatile memory element, and
      updates the address space to reflect the reference in the paging table.

15. The system of claim 14, wherein the at least one executing application directly accesses the volatile memory element in the bus adapter.

16. The system of claim 14, further comprising:
a user library configured to receive requests selected from a group consisting of allocate, read, and write from the at least one executing application, and issue commands to a memory management unit.

17. The system of claim 14, wherein the host computer is further configured to provide in the paging table M paging table entries including one paging table entry for each of M regions of the non-volatile memory element, and update a presence indicator in the paging table for N regions of the volatile memory element, where M and N are integers and M is greater than N.

18. The system of claim 17, wherein the host computer is further configured such that while accessing information from a first region of the volatile memory element, the first region being a most recently transferred region of the volatile memory element, the host computer:
   directs the transfer of a second region of the volatile memory element, the second region being an oldest region present in the volatile memory element, to the non-volatile memory element to produce a vacant region in the volatile memory element,
   updates a presence indicator in the paging table corresponding to the vacant region in the volatile memory element,
   identifies a subsequent region from the volatile memory element,
   transfers information stored in the subsequent region of the non-volatile memory element to the vacant region in the volatile memory element to define transferred information, and
   updates the paging table to reflect the transferred information in the volatile memory element.

19. The system of claim 18, wherein the system enables the at least one application executing in the host computer to access sequentially arranged data stored in the non-volatile memory element in a quantity that exceeds a storage capacity of the volatile memory element and firmware constrained input and output operations.

20. A computer-readable medium having stored thereon in computer executable non-transitory form instructions that, when executed on a processing system of a host computer, direct the host computer to:
   partition a non-volatile memory element coupled via a host bus adapter into M regions, where multiple such regions can be stored in a volatile memory element coupled to the non-volatile memory element via an input/output bus;
   partition the volatile memory element into N regions where M and N are integers;
   execute a host application that loads N−1 regions from the non-volatile memory element to the volatile memory element, and
   when instructions identify an input/output operation to a region which is not present in the volatile memory element;
   while accessing information from one of the N−1 regions of the volatile memory element:
      direct the transfer of a subsequent region from the non-volatile memory element to an $N^{th}$ region of the volatile memory element and further direct a return transfer of an oldest region present in the volatile memory element to a corresponding region of the non-volatile memory element to produce a vacant region in the volatile memory element; and
      update respective presence indicators in a paging table, which is disposed in the host computer, corresponding to completion of the transfer of the subsequent region and the return transfer to reflect information in the volatile memory element.

* * * * *